(No Model.) 6 Sheets—Sheet 1.

S. E. DAVIS.
VOTING MACHINE.

No. 549,631. Patented Nov. 12, 1895.

WITNESSES:
H. C. H. Cooper.
C. G. Crannell

INVENTOR:
S. E. Davis,
By Geo. B. Selden.
atty.

(No Model.)  6 Sheets—Sheet 2.
S. E. DAVIS.
VOTING MACHINE.
No. 549,631.  Patented Nov. 12, 1895.
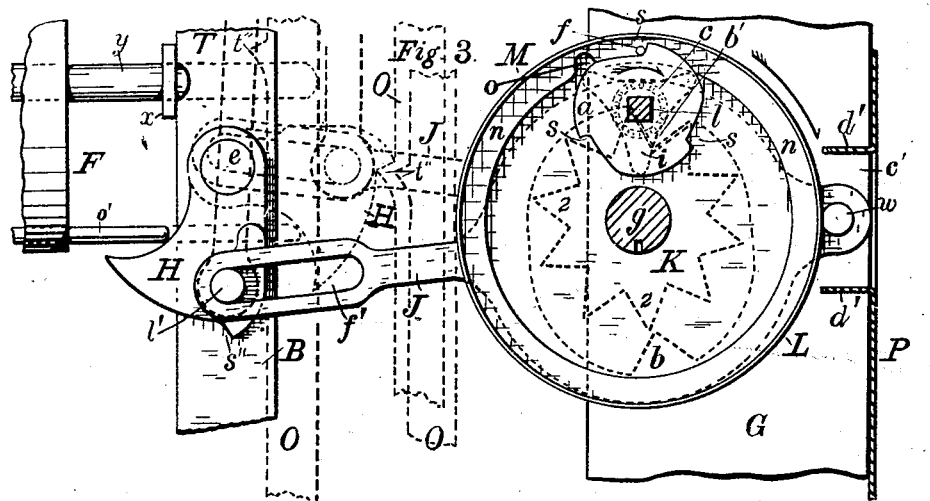
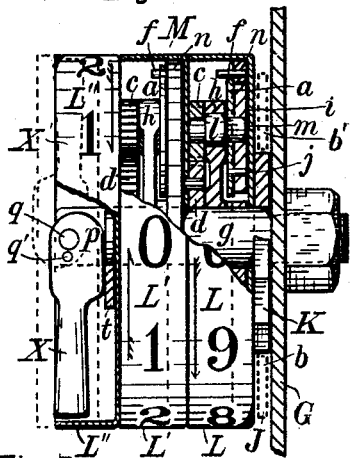
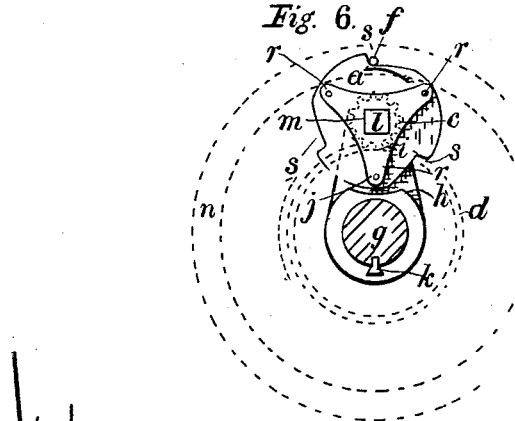
Witnesses:
H. C. H. Cooper.
C. G. Cramell.
Inventor:
S. E. Davis,
By Geo. B. Selden,
atty.
ANDREW B. GRAHAM. PHOTO-LITHO. WASHINGTON, D.C.

(No Model.) 6 Sheets—Sheet 3.
S. E. DAVIS.
VOTING MACHINE.
No. 549,631. Patented Nov. 12, 1895.
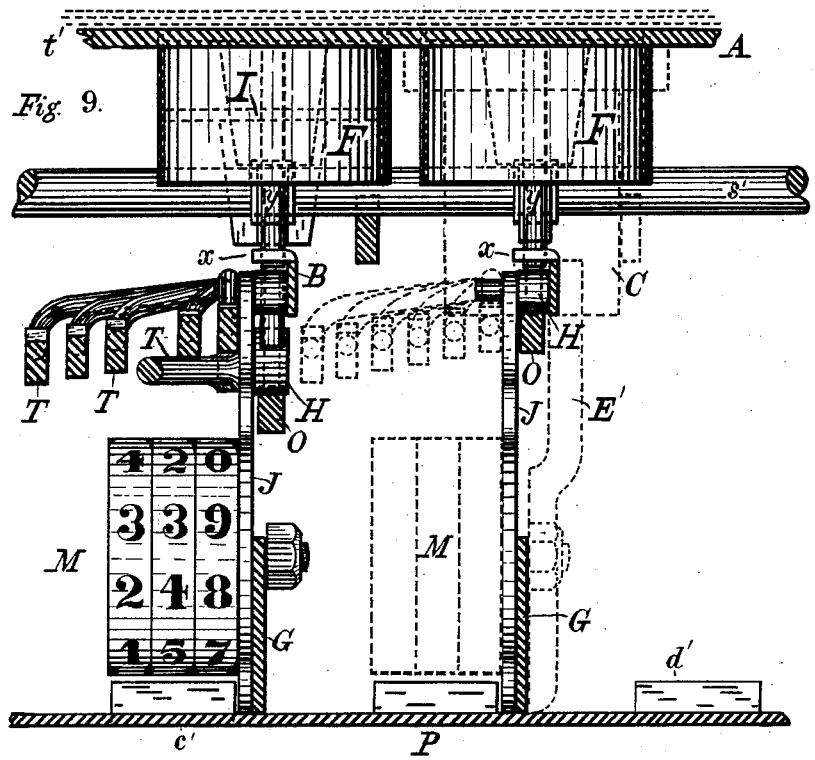
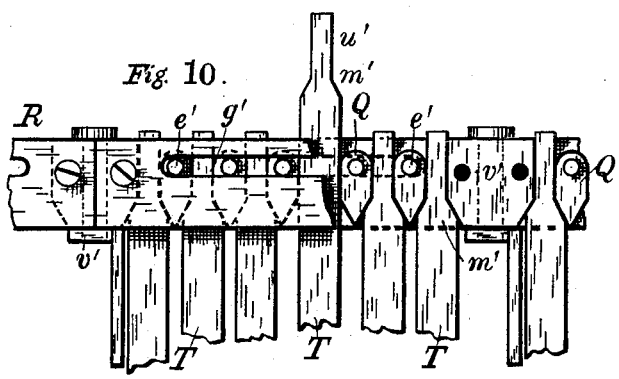
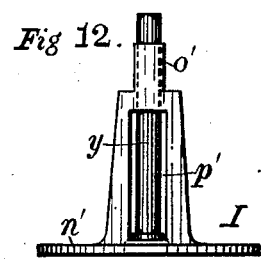
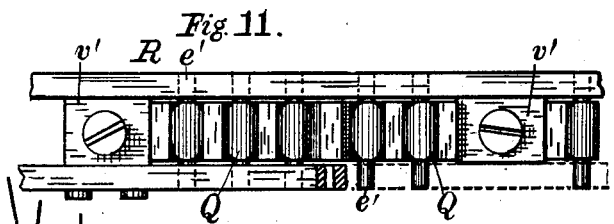
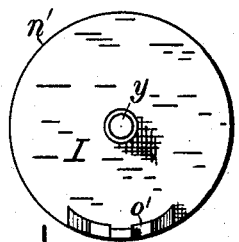
Witnesses:
H. C. H. Cooper.
C. G. Crannell.
Inventor:
S. E. Davis,
By Geo. B. Selden,
Atty.

(No Model.) 6 Sheets—Sheet 4.
S. E. DAVIS.
VOTING MACHINE.
No. 549,631. Patented Nov. 12, 1895.
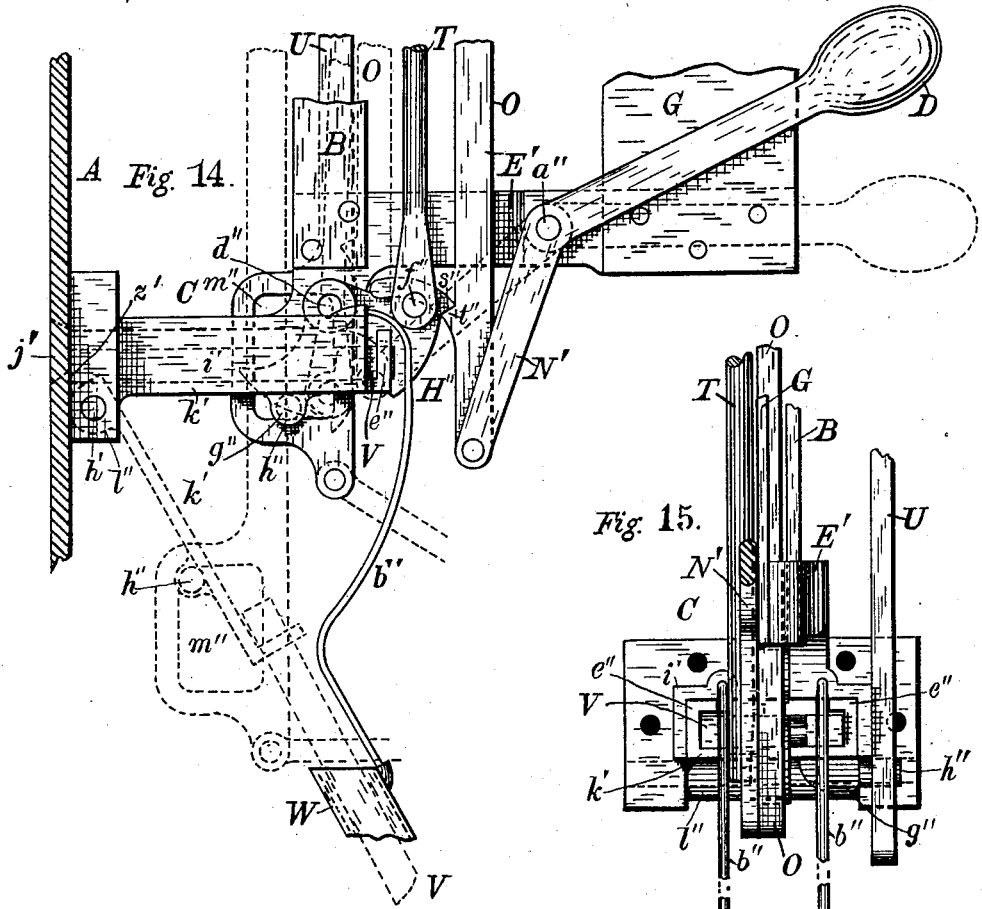
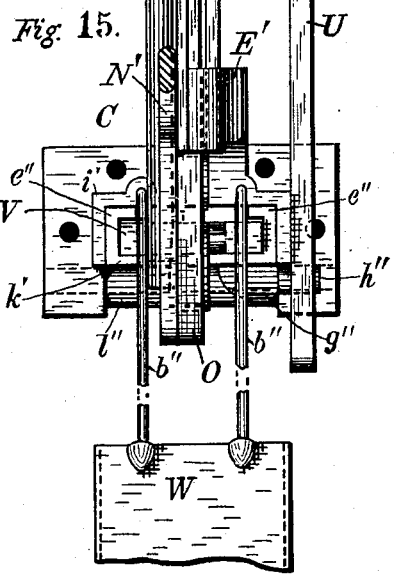
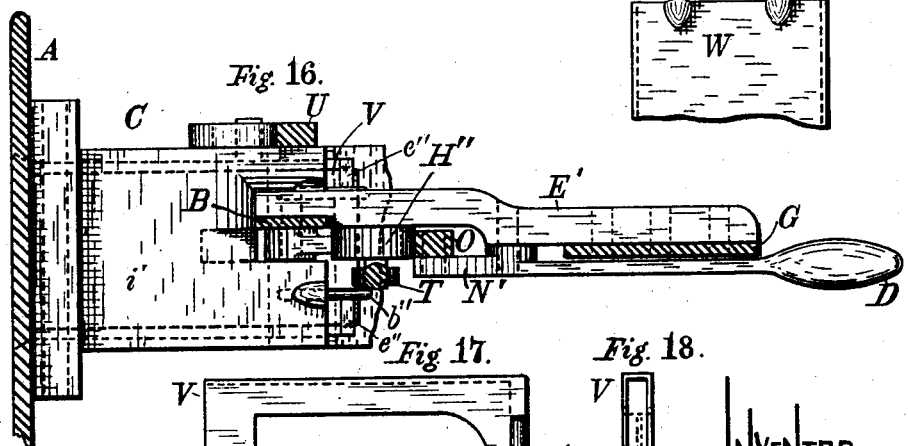
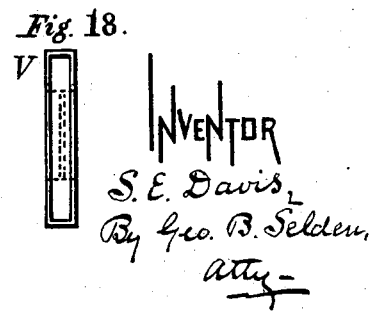
WITNESSES
HC H Cooper
C. G. Cramwell
INVENTOR
S. E. Davis,
By Geo. B. Selden,
Atty.

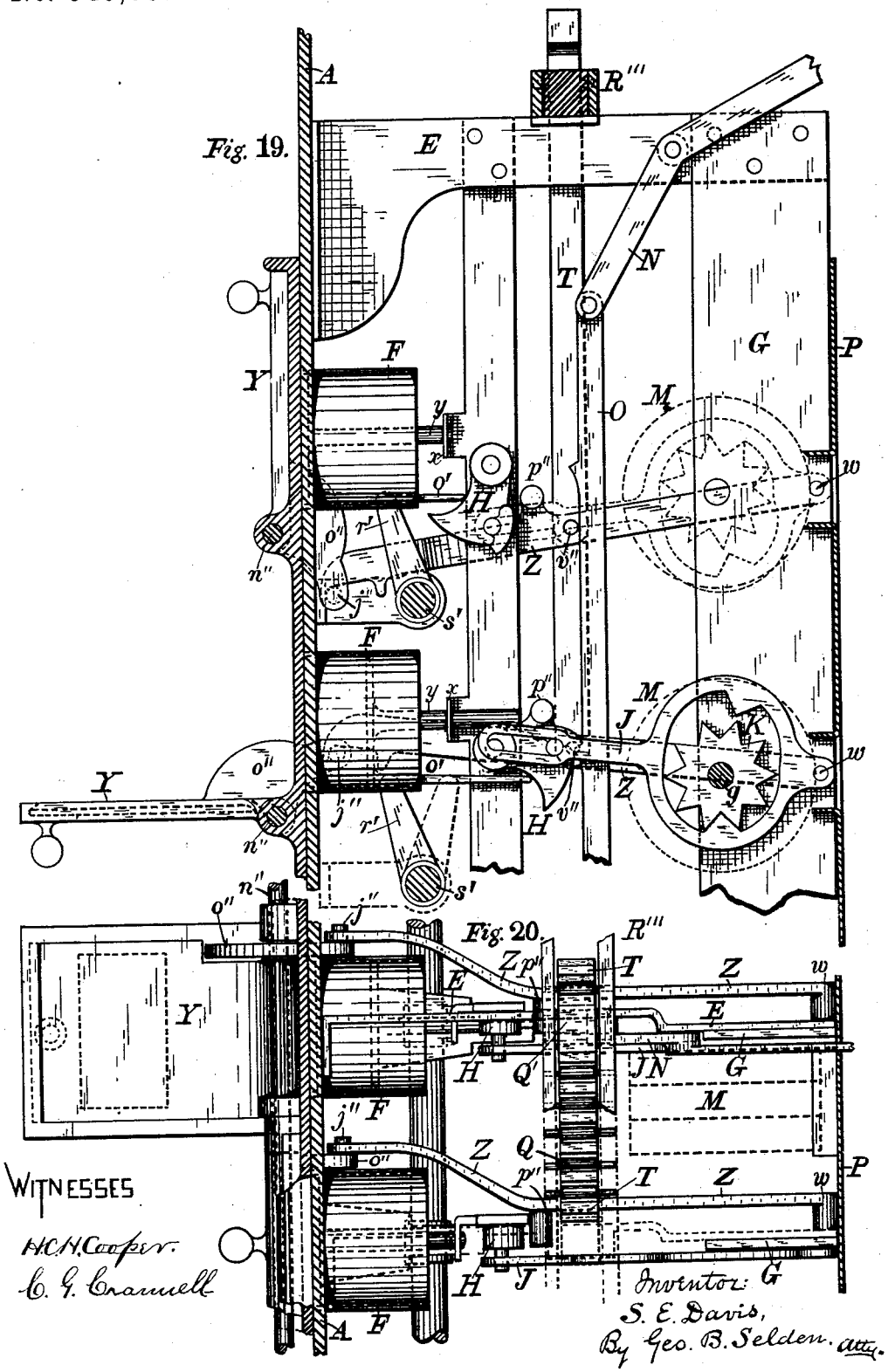

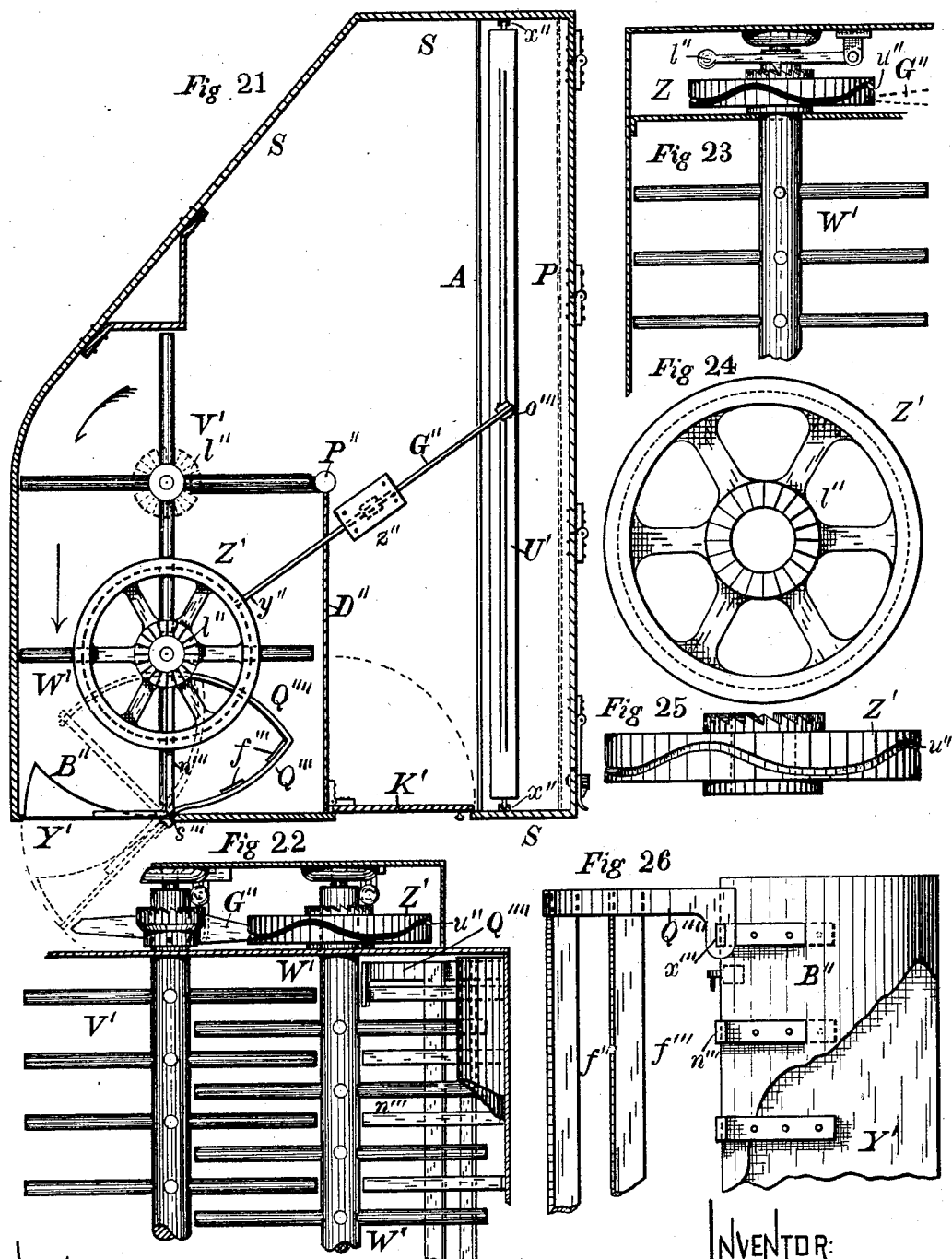

UNITED STATES PATENT OFFICE.

SYLVANUS E. DAVIS, OF ROCHESTER, NEW YORK, ASSIGNOR, BY DIRECT AND MESNE ASSIGNMENTS, OF SEVENTY-ONE ONE-HUNDREDTHS TO DANIEL B. PLATT, GEORGE B. SELDEN, JAMES F. HUTCHISON, AND ALEXANDER K. HONE, OF SAME PLACE.

VOTING-MACHINE.

SPECIFICATION forming part of Letters Patent No. 549,631, dated November 12, 1895.

Application filed September 22, 1894. Serial No. 523,763. (No model.)

*To all whom it may concern:*

Be it known that I, SYLVANUS E. DAVIS, a citizen of the United States, residing at Rochester, New York, have invented certain Improvements in Voting-Machines, of which the following is a specification, reference being had to the accompanying drawings.

My present invention relates to certain improvements on the voting-machine described in my application filed June 13, 1894, Serial No. 514,427, and patented September 25, 1894, No. 526,668, which improvements are fully described and illustrated in the following specification and the accompanying drawings, the novel features thereof being specified in the claims annexed to the said specification.

Figure 2:
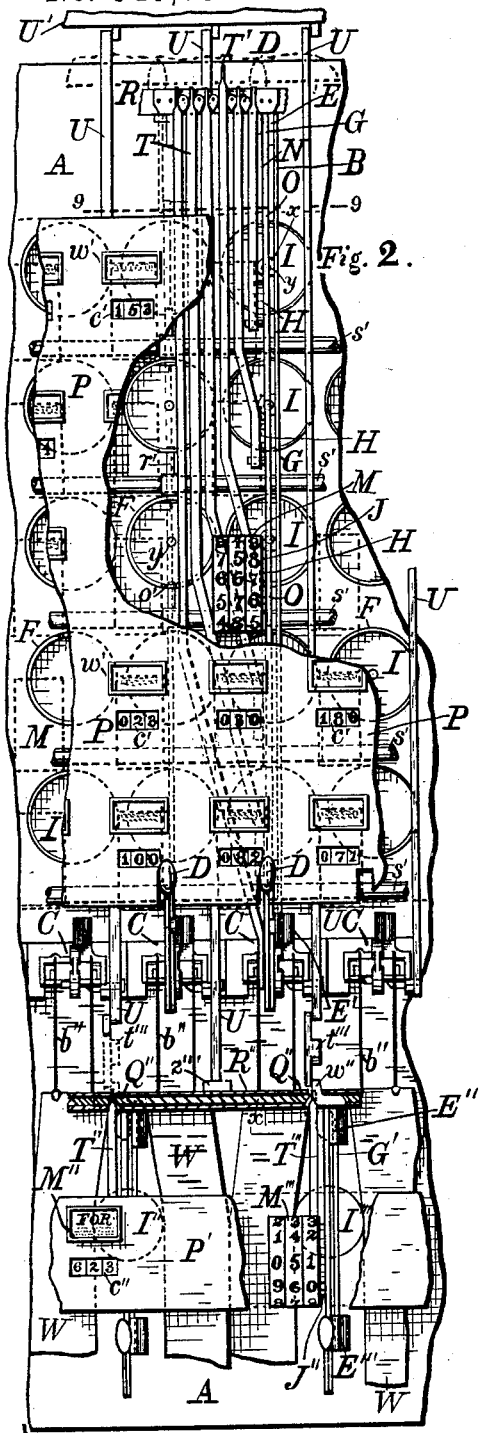
Figure 1:
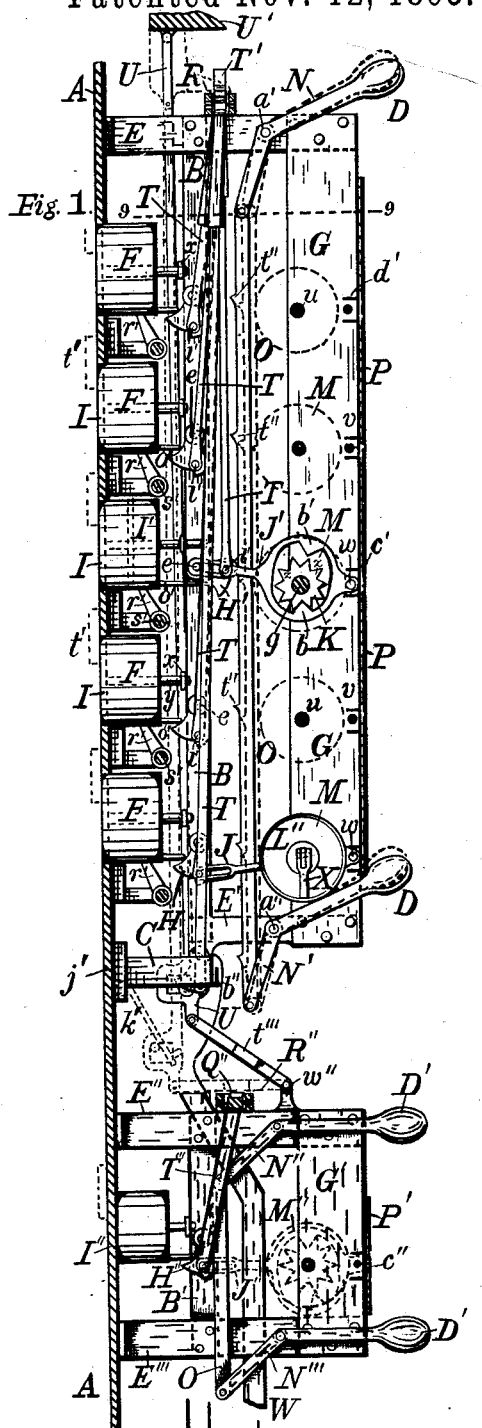

In the accompanying drawings, representing my present improvements in voting-machines, Figure 1 is a side elevation of one of the lines of pushes, showing the counters, interlocking mechanism, &c. Fig. 2 is a rear elevation of a portion of the main supporting-plate, showing the counters, interlocking mechanism, &c. Fig. 3 is a side elevation of the interior of one of the counter-rings, showing the counter-actuating mechanism. Fig. 4 is a rear elevation of the counter, partially in section. Fig. 5 represents the gearing of one of the counter-rings. Fig. 6 represents the star-wheel and notched disk and their supporting-arm, as seen from the right hand in Fig. 4. Fig. 7 is a side view of the star-wheel and notched disk and their supporting-arm detached, as seen from the right hand of Fig. 6. Fig. 8 is a side elevation of the counter, as seen from the left hand in Fig. 4. Fig. 9 is a horizontal section on the line 9 9, Figs. 1 and 2. Fig. 10 is a vertical section through the interlocking rollers and their supporting-frame. Fig. 11 is a plan view of the interlocking rollers. Fig. 12 is a plan view of one of the pushes. Fig. 13 is a rear elevation of the same. Fig. 14 is a side view of the irregular balloting mechanism. Fig. 15 is a rear elevation of the same. Fig. 16 is a plan view of the same. Fig. 17 represents the ballot-holder. Fig. 18 is a cross-section of the same. Fig. 19 is a side elevation of a portion of the mechanism of the multicandidate group. Fig. 20 is a plan view of the same. Fig. 21 is a plan view of the voting-booth, the top being removed. Fig. 22 is a side elevation of the turnstiles, as seen from the left hand in Fig. 22. Fig. 23 represents the ratchet mechanism on the turnstiles. Fig. 24 is a plan view of the cam-wheel on one of the turnstiles. Fig. 25 is a side view of the same. Fig. 26 is an interior view of the exit-door.

In the accompanying drawings, A represents a vertical plate having a series of tubes F inserted therein, in which the pushes I slide, by means of which the voter operates the counting or registering mechanism. The plate A is made of any suitable thickness and dimensions. The tubes in which the pushes slide are inserted in the plate so as to project from its rear side only. The pushes are preferably arranged in vertical lines, which comprise all the candidates for any particular office, and in horizontal rows, which correspond in number with the number of offices for which candidates are to be elected. Each horizontal row contains all the pushes devoted to the candidates of any one political party. The pushes I are arranged to slide freely in the tubes F, their construction being shown in Figs. 12 and 13. Each push I consists of a circular disk $n'$, which slides freely in the tube F, a central stem $y$, which acts as a guide, and a push-arm $o'$, which acts against the sector H and causes it to swing on its pivot when the push is actuated. The push-arm $o'$ is provided with a slot $p'$, in which the arm $r'$, Figs 1 and 2, on the rock-shaft $s'$ engages, this arrangement serving to enable the voter to vote a straight ticket if he desires, as hereinafter more fully described.

Each of the pushes I is provided with a pivoted sector H, which, through the counter-lever J, actuates the counting mechanism. The movement of the sector is represented by the full and dotted lines in Fig. 3, and also at J J', Fig. 1. The counters are represented at M. The movement of the pushes from left to right in Fig. 1 swings the sector upward and moves the counter-lever from J to J', and the lever through the pallets $b\ b'$, imparts a partial revolution to the star-wheel K, which operates the counting mechanism. When fully moved, the sectors are locked in position by the locking-bar O, which is supported on the pivoted counterweighted levers N N'. The locking-bar O normally bears against the sectors, and when one of them is moved it is carried away from the plate, maintaining a pressure against the sector during its movement and operating to restore the sector and push to normal position in case a partial or incomplete movement is given to the push by the voter, who is instructed that his vote will not register unless he forces the push clear in until it stays in. Such normal position of the locking-bar is indicated at O, Fig. 3, the edge of the bar bearing against the inner side of the sector, and also at O in the lower portion of Fig. 1, being omitted in the upper part of Fig. 1 to avoid confusion. Each of the sectors is provided with a projecting lip $s''$, which engages with a corresponding catch $t''$ on the bar O, which moves backward to permit this engagement whenever one of the sectors is moved. This movement is represented by the full and dotted lines in the upper part of Fig. 1, and also in Fig. 3.

It will be understood that the locking-bar O operates to engage with any one of the sectors in any one vertical line of pushes, including the sector of the irregular voting mechanism C hereinafter described. When one of the sectors is swung by a full movement of its push, as indicated at H', Figs. 1 and 3, the lip $s''$ engages with the catch $t''$, the bar being constantly urged toward the sectors by the weight or weights D D.

It will be observed that the levers N N' are so arranged on their pivots $a'$ $a''$ that the catches $t''$ come above the sectors, as indicated in Fig. 3, when the bar rests against the sectors. The movement of the sector also actuates the counting mechanism one step by swinging the lever J upward, as indicated by the full and dotted lines in Fig. 3.

The sector actuated is retained in the position of engagement with the locking-bar and is entirely independent of any further movement of the push, if any such could be produced by the voter. The pushes I are retained in the tubes F by the name-plates $t'$, secured to the front of the plate A. The sector, push, and counter-lever are restored or reset to normal position between each voting operation by mechanism hereinafter described.

To provide for supporting the studs of the counters and the pivots of the sectors of the counter-levers and of the arms which sustain the locking-bar, I have devised the following construction, which is simple and cheap and sustains the parts mentioned in their proper operative relations without possibility of derangement: To the rear side of the plate A, I attach the arms E E', which project backward a suitable distance and sustain the upright bar G, which is provided with openings $u$ for the studs $g$ of the counting mechanisms and with openings $v$ for the pivots $w$ of the counter-levers. These studs and pivots therefore maintain an invariable relation, and the pallets $b$ $b'$ will consequently always engage properly with the teeth $z$ of the star-wheel K. The lower arm E' may be attached to the irregular voting mechanism C, as shown in Fig. 1, or it may be attached to the plate A. The pivots $e$ of the sectors H are sustained by a vertical bar B, attached at its upper and lower ends to the arms E E'. A framework is formed by the bars B and G and the arms E E', which supports all the operative parts actuated by the pushes permanently in the proper positions. A series of lugs or bent lips $x$, Figs. 1 and 3, also serves to guide the stems $y$ of the pushes I. The arms E E' also support the pivots $a'$ $a''$ of the levers N N' of the locking-bar O. It will thus be seen that all the operative parts of any one line of pushes (except the pushes themselves) may be removed from the machine without disconnecting them from each other, and thus in case of the possible failure of any part of any such line a reserve section, containing the requisite parts, may be substituted in a very short time.

It will be understood that each line of pushes, &c., is provided with the framework B G E E'. To the rear of the bars G is attached a plate P, which covers the mechanism at the rear, being provided with openings $c'$, Figs. 1 and 3, through which the numbers registered by the counters may be read.

$d'$ represents flanges turned in from the plate P, or affixed thereto in any convenient way, which may be used to allow the view of only those figures directly at the rear of the counters.

The plate P extends in rear of all the voting-pushes, being slotted to permit the movement of the levers N N', if necessary. It is attached to the arms E E' or the bars G by angle-clips or in any other suitable manner, so that it may be readily removed to give access to the mechanism. The use of special casings surrounding the counters is obviated by the rear plate P, and the construction is thereby cheapened, while the mechanism is more efficiently protected.

It will be understood that side walls extending between the plates A and P may be applied to the ends and the top and bottom of the plate P, so that the mechanism may be entirely boxed in, except for such rods or levers as may be required to pass through the side walls.

The construction and operation of the interlocking mechanism, by which only one of the pushes in any one line is permitted to be actuated at any one time, will be understood from Figs. 1, 2, 10, and 11.

Each of the sectors has an interlocking rod T pivoted thereto, which extends along the plate to a series of interlocking wedges Q, by which the movement of more than one of the interlocking rods is prevented at any one time. The rods T are pivoted on bosses or pins $l'$, Figs. 1 and 3, on the sectors, which pins also serve to operate the counter-levers J by means of the slot $f'$, Fig. 3. The pins $l'$ are made long enough to extend through both the levers and the rods, the levers being placed next the sectors and the rods secured on the pins by cotters or other suitable devices. The interlocking wedges Q are supported in a suitable frame R, which is attached to the arms E. The interlocking rods are bent or offset laterally, as indicated in Figs. 2 and 9, so that they can move independently of each other and bring their ends in the proper relations with the interlocking wedges. Each line of pushes is provided with its corresponding series of interlocking rods and rollers.

When one of the sectors is moved, as indicated in Fig. 3, by the voter actuating a push, the interlocking rod connected with such sector is shifted lengthwise and its end $u'$ (or an enlarged portion $m'$, Fig. 10, of the rod) is forced between the interlocking wedges. The ends of the interlocking rods or the sides of the enlargement $m'$ are beveled to facilitate their entrance between the wedges.

The frame R is made of such a length relative to the sum of the diameters of the wedges and the thickness of one of the interlocking rods or the enlargement thereon that only one of the rods can be inserted between the wedges at any one time and so that after one rod has been so inserted the wedges resist the movement of any of the other rods, and consequently prevent the actuation of more than one of the pushes in any one line at any given time. The frame R is constructed in any suitable manner so as to retain the wedges in position and to permit their lateral expansion. It may be made to extend the whole length of the row of pushes; but I prefer to make it in removable sections, each section containing the interlocking wedges for one line of pushes and being fastened to the arms E by angle-clips or in any other suitable manner. In case there are five rows of candidates for as many political parties and one row for irregular voting there will be six interlocking rods and seven interlocking wedges.

The frame R is provided with suitably-located stops $v'$, Fig. 10, which limit the expansion of the wedges. These stops are secured in the frame in any suitable manner. The frame is conveniently made of two bars placed at such a distance apart as to form a space through which the rods T pass freely. It will be observed that the rollers are provided with pins $e'$, which enter slots $g'$ in the frame. The ends of the rods are preferably thinned, and the thin ends remain always engaged with the wedges, as indicated in Fig. 10, the expansion of the wedges to fill the space between the stops $v'$ $v'$ being produced by one of the beveled enlargements $m'$.

When one of the rods, as T', Figs. 1 and 10, is inserted by the movement of the corresponding sector between the interlocking wedges, the wedges are forced laterally against the stops $v'$ $v'$, the other rods swinging laterally to a slight degree, and then the rollers resist the insertion of the enlargement $m'$ on any of the other rods between them. Consequently a voter cannot operate more than one of the pushes in any one vertical line; neither can he operate the irregular voting mechanism; nor in case he has cast an irregular vote can he operate any of the pushes in the same vertical line. The stops are secured in the frame in any suitable way.

Proceeding now to a description of the counting mechanism proper, it consists, essentially, of the star-wheel K and a number of rings L L' L'', provided with suitable figures on the outside, and the notched disks $a$, pinions $c$, and gears $d$, by which the movement of one ring is transmitted to the next. The counter is supported on a stud $g$, inserted in the arm or plate G. The star-wheel K is secured to the ring L, so that they revolve together. The star-wheel receives from the counter-lever J an intermittent movement of one-tenth of a revolution at each voting operation. The ring L is provided with a pin $f$, Figs. 3 and 4, which engages with one of the notches in the disk $a$ and causes it to make a partial revolution, which movement is completed by the star-wheel $i$. This movement is transmitted by the pinion $c$ to the gear $d$, secured to the next ring L'. The notched disk, star-wheel, and pinion are supported from the stud $g$ by the arm $h$, which is fastened on the stud by the key $k$, Fig. 6, or other suitable device, so that it cannot turn on the stud. This key is preferably dovetailed in the arm, as shown; but any other suitable device may be employed. A shaft $l$ revolves in a suitable journal near the outer end of the arm $h$ and supports the pinion, the notched disk, and the star-wheel, which parts are fastened to the shaft, so that they are compelled to revolve therewith. The end of the shaft to which the notched disk and star-wheel are applied may be squared, as represented at $m$. The notched disk and the star-wheel may be formed in one piece or secured together by screws or rivets $j$. The ring L is provided with an internal ring or flange $n$, which carries the pin $f$, and is provided with a notch $o$, into which the points $r$ of the star-wheel $i$ project when the star-wheel turns.

The operation of the mechanism of my improved counter will now be readily understood. The parts being properly proportioned, as the first ring L revolves the pin $f$ will come in contact with one of the notches $s$ in the disk $a$ and will turn the disk and the star-wheel $i$ until the latter engages in the notch $o$, and by the combined action of the disk and the star-wheel the pinion $c$ is turned such a part of a revolution as will impart to the gear $d$ and the second ring L', secured thereto, one-tenth of a revolution. The arrangement of the parts is such that this movement of the second ring L' takes place at the time the first ring is changing from "9" to "0." Every time the first ring L makes a complete revolution the second ring L' is shifted one figure or one-tenth of a revolution. In the meantime the second ring L' is locked against movement by the contact of two of the points $r$ of the star-wheel $i$ with the interior of the flange $n$ on the ring L. The ring L and the flange $n$ may be made in one piece. It will thus be seen by my improvement a positive mechanical connection is maintained all the time between the rings or figured wheels of the counter, while the whole mechanism is contained within the rings themselves. The ring L' in the construction shown will revolve in the opposite direction from the ring L; but it may be made to revolve in the same direction by the use of an internal gear in place of the spur-gear $d$. The third ring L'' is actuated by similar mechanism from the ring L', so as to make one-tenth of a revolution at the completion of a revolution of the second ring. The same locking device is employed to prevent movement of the third ring, except at the proper times.

The rings may be set or returned to zero position by shifting them longitudinally on the stud $g$ a sufficient distance to disengage the star-wheel K from the counter-lever J and gears from the pinions. This may be accomplished by providing the stud $g$ outside the third ring L'' with a nut or other detachable device; but I prefer to employ the cam-lever X. (Shown in Figs. 4 and 8.) This lever is pivoted on the end of the stud and provided with an eccentric or cam $p$, which in one position of the lever holds the rings together, so that the pinions and gears are in mesh, but in another position (see dotted lines X') permits the rings to be separated just far enough to disengage the pinions and gears and to allow the rings to be turned independently of each other, so that they may be set properly for the commencement of another counting operation. They are then secured in the proper relation with each other by a movement of the lever X. The shifting of the rings lengthwise on the stud is indicated by the dotted lines in Fig. 4.

It will be understood that the counter is protected by a case or plate provided with an opening through which only one row of the figures on the counter-rings can be observed at any one time.

The cam $p$ is pivoted in the end of the stud $g$ on the pin $q$, and a removable pin $q'$ or other suitable device may be employed to lock the lever X in place. A washer $t$ is inserted between the cam $p$ and the ring L''. The lateral movement of the ring L disengages the star-wheel from the pallets $b$ $b'$ of the counter-lever J, so that this ring can be set at any desired point.

It will be seen that the construction of the counter herein shown enables me to inclose all the ring-operating mechanism within the dimensions of the rings or other rotatory indicating devices employed, while at the same time maintaining a constant mechanical engagement between the parts, which prevents failure of action or overthrow, and that provision is also made for returning the rings to the zero position in a simple and expeditious manner.

The mechanism for voting on questions is represented in Figs. 1 and 2. It consists, essentially, of two pushes I'' I''', each of which is provided with a sector, counter-lever, and counting mechanism similar to those already described, and which sectors are interlocked against each other by the interlocking rods T'' T''' and the interlocking wedge Q''. One of the pushes I'' or I''' registers on its corresponding counter M'' or M''' an affirmative vote on the question proposed and the other a negative vote. The sectors H'', counter-levers J'', locking-bar O'', and counter M'' are supported from the plate A by the arms E'' E''' and the bars B' G', Fig. 1, in a manner similar to that already described. The locking-bar O'' is supported by the levers N'' N''', pivoted on the arms E'' E''', and provided with the counterweights D' D'. The interlocking wedges Q'' are supported by the frame R'', attached to the arms E''. At the rear of the bar G' is placed the plate P', provided with openings $c''$, through which the counters may be read. This plate is also provided with suitable placards indicating the character of the votes cast as for or against the question proposed. The voter can only operate one of the pushes I'' I''', so that he can only vote in favor of or against a pending question. On actuating one of these pushes its corresponding interlocking rod is thrust upward and shifts the wedge Q'' laterally, so as to prevent the operation of the other rod and its push.

The mechanism for resetting the questions-voting apparatus or restoring it to normal position for the next succeeding voter will be described later.

The irregular balloting device is represented on an enlarged scale in Figs. 14, 15, 16, 17, and 18. C is the balloting device proper, which consists of a channeled casting $i'$, having a movable bottom $k'$, which is depressed, as shown by the dotted lines in Fig. 14, so as to deliver the ballot, inclosed in a suitable ballot-holder, into a receiver provided for it. The channeled casting $i'$ is placed opposite an opening $j'$ in the supporting-plate A, so that when the ballot-holder is inserted in the opening it enters the channeled casting and operates the sector, turning it to the position indicated by the full lines H'', Fig. 14, and interlocking the pushes in the same vertical line.

The sector engages by the lip $s''$ with catch $t''$ on the locking-bar O, which in case the ballot-holder is not fully inserted in the channel returns it toward the voter, the same as it restores a partially-actuated push to normal position. The ballot-holder is represented in Figs. 17 and 18, although any suitable device of the kind may be employed. It consists of a suitable box V, of metal or other suitable material, open on one side or end for the insertion of the ballot, and preferably having the corners at one end rounded or bent inward, as indicated at $y'$, Fig. 17, where the contact is made with the sector.

The ballot-holder is made of suitable size and dimensions adapted to those of the channeled casting $i'$, so that the sector will be operated when the ballot-holder is fully inserted in the channel, its outer end resting against a shoulder $z'$, Fig. 14, on the plate A, which projects slightly above the bottom $k'$. This shoulder also prevents the removal of the ballot-holder after it has been once inserted fully. In the construction shown the arm $E'$ is formed integral with the channeled casting; but it may be separate therefrom, or it may be secured directly to the plate A. The movable bottom $k'$ is pivoted at $h'$ to the lower front part of the channeled casting $i'$ on a pin passing through a head or enlargement $l''$. The free end of the movable bottom $k'$ is provided with guides or hooks, by which the ballot-holder is held in place laterally during the movement of the bottom until it reaches the position where the ballot-holder is delivered into the tube or chute W, Fig. 14, through which it passes into a suitable box or receiver. Such hooks are represented at $e''$, Figs. 14, 15, and 16. They preferably extend inward a short distance over the ballot-holder. A curved guide or guides $b''$ serve to prevent the ballot-holder from slipping off the bottom $k'$ lengthwise until it arrives at the opening of the chute W. The sector $H''$ is pivoted to the casting $i'$ at $d''$, Fig. 14. The interlocking rod T is pivoted to the sector at $f''$, the upper part of the casting being slotted to permit the swinging movement of the sector. The position of the ballot-holder as it passes from the bottom plate $k'$ into the chute W is indicated by the dotted lines in Fig. 14. The interlocking rods may be round or of any other suitable shape in cross-section. On the side of the bottom plate $k'$ is a boss $g''$, which carries a stud $h''$, Figs. 14 and 15, which projects laterally beyond the casting $i'$ and engages with the rod U, which is connected with the resetting-bar. The rod U reciprocates up and down with the resetting-bar and depresses and raises the bottom plate $k'$, for the purpose of discharging the ballot-holder into the chute W and of restoring the apparatus to normal position for the next voter. The pin $h''$ preferably engages in a slot in the lower end of the rod U, and this slot may be widened, as indicated at $m''$, Fig. 14, in case the movement of the rod is greater than the vertical travel of the pin.

Figs. 19 and 20 represent a modified construction of the interlocking devices between the doors of the multicandidate group. Fig. 19 shows in side view two of the pushes, counters, and actuating mechanisms of one of the vertical lines of pushes of the multicandidate group, and Fig. 20 is a plan view of two of the pushes in adjacent lines. The general arrangement and construction are the same as indicated in my said patent; but I now connect the doors Y with the interlocking rods T by the pivoted levers Z. The entire line comprises any suitable number of pushes, and also an irregular balloting device. F represents the tubes attached to the plate A, in which the pushes slide; H, the sectors; J, the counter-levers, and M the counters. In the upper part of Fig. 19 the door Y is represented as closed, and in the lower part the door Y is shown open, the push also having been actuated and the sector thrown up and engaged with the locking-bar. The doors are pivoted at $n''$, and they are provided with curved arms $o''$, which pass through slots in the plate A and engage with the free ends of the levers Z, which are pivoted to the upright bar or plate G, for convenience, on the same pin $w$ on which the counter-levers J are pivoted, but on the opposite side of the plate. The levers Z are pivoted to their respective interlocking rods T at $v''$, Fig. 19. The arms $o''$ are provided with laterally-projecting lugs or pins $j''$, which engage under the free ends of the levers Z. Each of the levers is provided with a projecting lug $p''$, which extends over the corresponding sector. The operation is as follows: The voter opens the door Y, and the arm $o''$ by the pin $j''$ raises the lever Z, and it thrusts its corresponding interlocking rod between the wedges Q in the frame $R'''$. As the lug $p''$ rises upward with the lever $g$ it travels out of the path of the sector; but when the interlocking rod is restored or moved downward by the resetting-bar the lug $p''$ swings the sector downward, and this returns the push to its normal position. The construction of the interlocking wedges Q is similar to that already described, except that at $Q'$, Fig. 20, over the counter-lever and the arm E a wider wedge is employed, which may be supported by two pins in grooves in the frame, and except that space is provided for the insertion between the wedges of the multicandidate group of a number of the interlocking rods corresponding with the number of candidates permitted to any one political party.

Fig. 21 is a plan view of the booth of my improved voting-machine, showing the general arrangement. The sides of the booth are represented at S. $K'$ is the entrance-door; A, the supporting-plate; $U'$, the resetting-bar, and $V'$ $W'$ the turnstiles, through which the voter emerges from the booth, $Y'$ being the outlet-door. The resetting-bar $U'$ is operated from the second turnstile $W'$ by the cam $Z'$ and lever $G''$. The turnstiles are each provided with a ratchet and gravity-pawl device $l''$, (shown best in Fig. 20,) by which they are prevented from turning in the wrong direction. The voter having cast his vote simply walks through the turnstiles in the path indicated by the arrows in Fig. 21 and opens the door Y', through which he finally emerges from the booth. D" represents a partition-wall by which the turnstiles are separated from the space adjacent to the voting mechanism. A post P" is placed at the inner end of the partition D" and carries a series of arms or bars, which project between the arms of the turnstile V' nearly to its central post. The post of the turnstile W' carries, preferably near its upper end, the cam-wheel Z', provided around its periphery with the cam-groove $u''$, which is given such a shape that it imparts an up-and-down motion to the resetting-bar U' every time the turnstile W' makes a quarter-revolution. The end $y''$ of the lever G" projects into the groove $u''$. The lever is pivoted at $z''$ to a bracket attached to the top of the booth, the ratchet mechanism, cam-wheel, and lever being preferably inclosed in any suitable casing placed on the top of the booth, as indicated in Fig. 22, to prevent any of the voters having access to these parts. The resetting-bar U' is arranged to slide up and down on suitable ways $x''$ on the side of the booth and is connected with the lever G" by the connection $o'''$. The door Y' is hung at $s'''$ to the wall of the booth, and it is provided on its inner side with a projecting casing B", which fills the space between it and the outer ends of the turnstile W', so that no space is left at this point. The door is provided with two or more inwardly-projecting arms Q''', which carry one or more bars $f''''$, (or a curved plate,) which when the door is opened are interposed in the path of the arm of the turnstile W', so that the door is closed by the movement of the turnstile. The position of the parts when the door is opened is represented by the dotted lines in Fig. 21.

A series of arms $n''$, Figs. 21, 22, and 26, extend inward from the door between the arms of the turnstile W, and the arms Q''' are sustained on the upper and lower members of the series $n'''$, as indicated at $x'''$, Fig. 26. By this construction provision is made for preventing the turning of the turnstile W' when the door Y' is open. The turnstile V' prevents access to the turnstile W' from the interior of the booth. A curved bar Q'''' connects the outer ends of the arms $n'''$ and the curved arm Q'''. It will thus be seen that the arrangement described prevents the operation of the resetting-bar except by the voter on his way outward from the booth, while at the same time no obstacle except such as yields to a push is interposed in the path of the voter when leaving the booth.

The resetting-bar U' forces downward all the resetting-bars—such as T', Figs. 1 and 2—which have been inserted between the interlocking wedges by the voter in the operation of casting his vote or depositing his ballot. The movement of the resetting-bar is indicated by the full and dotted lines in Figs. 1 and 2. The rods U, which are pivoted to the resetting-bar U', are also depressed at the same time, and these rods operate the movable bottom $k'$ of the irregular balloting devices, as already described.

Attached to the lower end of the rod U is a pivoted lever $t'''$, which as it descends (see full and dotted lines in Fig. 1) forces the interlocking rods of the questions-voting devices downward, thereby restoring these mechanisms also to normal position. The lever $t'''$ is pivoted at $w''$ to the arm E". It is widened near its middle to make contact with the upper ends of the interlocking rods T" and T'''. It will be seen that such of the rods N as are provided with the levers $t'''$ are guided by such levers; but the intermediate rods which are not so provided slide in blocks or guides $z'''$, Fig. 2, attached to the frame R".

The plate P is provided with suitable name-plates $w'$, Fig. 2, showing the names of the candidates and the titles of the officers for which the votes are cast in correspondence with the name-plates on the front of plate A.

The construction of the straight-ticket mechanism is substantially like that described in my patent already mentioned. $s'$ is a rock-shaft supported by suitable brackets on the rear side of the supporting-plate and connected with a straight-ticket lever which projects through the plate. The rock-shaft is provided with a series of arms $r'$, one of which engages with a slot $p'$, Fig. 12, in each of the pushes, the arrangement being such that the push is free to move independently of the arm; but when the rock-shaft is turned partially all the pushes in the same horizontal row will be actuated, along with the corresponding counting and interlocking mechanisms. The arms $r'$ also prevent the pushes from turning axially.

I claim—

1. The combination, in a voting machine, of a booth inclosing voting mechanism, and having an exit passage provided with two turnstiles, operated by the voter in succession and arranged to revolve in one direction only,— the first turnstile being arranged to prevent the return of the voter to the key-plate,— and suitable connecting mechanism between the second turnstile and the voting mechanism, whereby the latter is restored to normal position by the exit of the voter from the booth, substantially as described.

2. The combination, in a voting machine, of a booth inclosing voting mechanism, and having an exit passage provided with two turnstiles, operated by the voter in succession and arranged to revolve in one direction only, suitable connecting mechanism between the second turnstile and the voting mechanism, whereby the latter is restored to normal position by the exit of the voter from the booth, and an exit door located beyond the second turnstile, and connected therewith, substantially as described.

3. The combination, in a voting-machine, of the booth, the voting mechanism, the resetting bar, the exit passage and the turnstiles V' W', the non-return ratchet mechanisms l'', cam Z' and lever G'', substantially as described.

4. The combination, in a voting machine, of the booth, the voting mechanism, the resetting bar, the exit passage and the turnstiles V' W', the non-return ratchet mechanisms l'', cam Z', lever G'', and the exit door Y', substantially as described.

5. The combination, in a voting machine, of the booth, the voting mechanism, the resetting bar, the exit passage and the turnstiles V' W', the non-return ratchet mechanisms l'', cam Z' and lever G'', and the exit door Y', provided with arm Q''' whereby the door is prevented from being opened except when the turnstile is at rest, substantially as described.

6. The combination, in a voting machine, of a suitable supporting plate, a series of tubes attached thereto in a line, a corresponding series of movable slides arranged in the tubes, the connecting mechanisms provided with toothed wheels, the oscillating counter levers, the bar extending lengthwise of the plate and arranged to support the counting mechanisms and the pivots of the counter-levers, and the supporting brackets between the plate and the bar, substantially as described.

7. The combination, in a voting-machine, of a suitable supporting plate, a series of tubes attached thereto in a line, a corresponding series of movable slides arranged in the tubes, the counting mechanisms provided with toothed wheels, the oscillating sectors and counter levers, the bar extending lengthwise of the plate and arranged to support the pivots of the sectors, and the supporting brackets between the plate and the bar, substantially as described.

8. The combination, in a voting-machine, of a suitable supporting plate, a series of tubes attached thereto in a line, a corresponding series of movable slides, arranged in the tubes, the counting mechanisms provided with toothed wheels, the oscillating sectors and counter levers, the bar extending lengthwise of the plate and arranged to support the pivots of the sectors, the guides on the bar for the slides, and the supporting brackets between the plate and the bar, substantially as described.

9. The combination, in a voting machine, of a suitable supporting plate, a series of tubes attached thereto in a line, a corresponding series of movable slides arranged in the tubes, the counting mechanisms provided with toothed wheels, the oscillating sectors and counter-levers, the bar extending lengthwise of the plate and arranged to support the counting-mechanisms and the pivots of the counter-levers, the bar arranged to support the pivots of the sectors, and the supporting brackets by which the bars are attached to the plate, substantially as described.

10. The combination, in a voting-machine, of a suitable supporting plate, a series of tubes attached thereto in a line, a corresponding series of movable slides arranged in the tubes, the counting mechanisms provided with toothed wheels, the oscillating sectors and counter-levers, the bar extending lengthwise of the plate and arranged to support the counting-mechanisms and the pivots of the counter-levers, the bar arranged to support the pivots of the sectors, the supporting brackets by which the bars are attached to the plate, and the locking bar arranged to engage with the sectors, substantially as described.

11. The combination, in a voting-machine, of a suitable supporting plate, a series of tubes attached thereto in a line, a corresponding series of movable slides arranged in the tubes, the counting mechanisms provided with toothed wheels, the oscillating sectors and counter-levers, the bar extending lengthwise of the plate and arranged to support the counting mechanisms and the pivots of the counter-levers, the bar arranged to support the pivots of the sectors, the supporting brackets by which the bars are attached to the plate, and the rear protecting plate provided with openings opposite the counting mechanisms, substantially as described.

12. The combination, in a voting machine, of two question slides, each provided with counting mechanisms, suitable positive-acting counter actuating mechanisms, and interlocking rods and suitable interlocking devices, the resetting-bar, the intermediate connecting rods, and the levers t''', adapted to restore the interlocking rods and counter-actuating mechanisms to normal position, substantially as described.

13. The combination, in a voting-machine, of two or more movable parts adapted to be actuated by a voter, corresponding counting mechanisms, counter-actuating mechanisms and beveled interlocking rods, and the beveled movable interlocking-wedges Q, supported in a frame having suitably-arranged stops which limit the lateral movement of the wedges, substantially as described.

14. The combination, with the beveled interlocking-rods T, of the movable beveled interlocking-wedges Q, having projections e', and the frame R having slots g' and the stops v', substantially as described.

15. The combination with the slotted stud g, of the figured rings L L' L'', the intermediate internally located operating mechanism, comprising the flanges n, having notches o and pins f, the notched disks a and pinions c, the gears d, and the laterally movable arms h, provided with splines k, substantially as described.

16. The combination, in a voting-machine, of a suitable supporting plate, a movable slide in the multicandidate group, provided with a counting mechanism and positive counter-actuating mechanism, the pivoted door protecting the slide, provided with an arm projecting through the plate, the pivoted lever, and the interlocking rod pivoted thereto, substantially as described.

17. The combination, in a voting-machine, of a suitable supporting plate, a movable slide in the multicandidate group, its corresponding oscillating sector and counter-lever, the counting-mechanism, the pivoted door protecting the slide, provided with an arm projecting through the plate, the pivoted lever provided with a lug in the path of the sector, and the interlocking rod pivoted to the lever, substantially as described.

18. The combination, in a voting-machine, of a suitable supporting plate, two or more movable slides in the multicandidate group, corresponding oscillating sectors, counter levers and counting mechanisms, pivoted doors protecting the slides, each provided with an arm projecting through the plate, pivoted levers provided with lugs in the path of the sectors, the interlocking rods pivoted to the levers, the interlocking devices, and the movable resetting bar, substantially as described.

19. The combination, with the resetting bar of a voting-machine, of two turnstiles and an exit door, the second turnstile being connected mechanically to the resetting bar, and the first turnstile and the door being arranged to prevent access to the second turnstile from the booth or from the outside of the booth, substantially as described.

SYLVANUS E. DAVIS.

Witnesses:
H. C. H. COOPER,
C. G. CRANNELL.